(12) United States Patent
Wang (10) Patent No.: US 9,344,864 B2
(45) Date of Patent: May 17, 2016

(54) REDIRECTION METHOD AND REDIRECTION APPARATUS UNDER POLICY AND CHARGING CONTROL

(71) Applicant: Huawei Technologies Co., Ltd., Shezhen, Guangdong (CN)

(72) Inventor: Jun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 14/094,517

(22) Filed: Dec. 2, 2013

(65) Prior Publication Data

US 2014/0087775 A1    Mar. 27, 2014

(30) Foreign Application Priority Data

Jun. 3, 2011    (CN) .......................... 2011 1 0150113

(51) Int. Cl.
*H04W 4/12* (2009.01)
*H04L 12/14* (2006.01)
(Continued)

(52) U.S. Cl.
CPC .............. *H04W 4/12* (2013.01); *H04L 12/1407* (2013.01); *H04L 12/1467* (2013.01); *H04M 15/66* (2013.01); *H04M 15/881* (2013.01); *H04W 4/24* (2013.01)

(58) Field of Classification Search
CPC . H04W 72/04; H04W 72/0493; H04W 28/16; H04W 28/18; H04W 76/00; H04W 76/02; H04W 80/10; H04W 88/18; H04W 92/02; H04W 4/24; H04W 4/26; H04W 8/08; H04W 8/18; H04W 8/20; H04W 8/22; H04W 8/24; H04W 36/0022; H04W 4/12; H04W 68/00; H04L 67/14; H04L 12/58; H04L 12/1407; H04L 12/1467; H04M 15/66; H04M 15/881; H04M 1/72522; H04M 15/00
See application file for complete search history.

(56) References Cited

U.S. PATENT DOCUMENTS

| | | | |
|---|---|---|---|
| 8,792,495 B1 * | 7/2014 | Dixon et al. ................. | 370/394 |
| 9,026,100 B2 * | 5/2015 | Castro Castro et al. ...... | 455/418 |

(Continued)

FOREIGN PATENT DOCUMENTS

| | | |
|---|---|---|
| CN | 101072113 A | 11/2007 |
| CN | 101583114 A | 11/2009 |

(Continued)

OTHER PUBLICATIONS

Hakala et al., "Diameter Credit-Control Application," Network Working Group, Request for Comments: 4006, pp. 1-114, Internet Society, Reston, Virginia (Aug. 2005).

(Continued)

*Primary Examiner* — Meless Zewdu
(74) *Attorney, Agent, or Firm* — Leydig, Voit & Mayer, Ltd.

(57) ABSTRACT

The present invention relates to the field of communication technology. Disclosed are a redirection method and a redirection apparatus under policy and charging control (PCC) for improving user's service experience. The redirection method under PCC comprises: acquiring a user's service status change information and the current scenario information; determining whether to issue a redirection task to a policy and charging enforcement function (PCEF) according to the current scenario information; when a redirection task needs to be issued to the PCEF, then generating a redirection indication message according to the service status change information and the current scenario information, the redirection indication message comprising redirection indication information; and sending the redirection indication message to the PCEF so that the PCEF performs a redirection operation according to the redirection indication information in the redirection indication message.

13 Claims, 4 Drawing Sheets

(51) Int. Cl.
*H04M 15/00* (2006.01)
*H04W 4/24* (2009.01)

(56) References Cited

U.S. PATENT DOCUMENTS

| | | | |
|---|---|---|---|
| 2008/0046963 A1* | 2/2008 | Grayson et al. | 726/1 |
| 2008/0229385 A1* | 9/2008 | Feder | H04L 12/14 726/1 |
| 2009/0182883 A1* | 7/2009 | Giaretta | G06Q 40/00 709/228 |
| 2010/0146596 A1* | 6/2010 | Stenfelt | H04L 63/102 726/4 |
| 2011/0116377 A1* | 5/2011 | Batz | H04L 43/026 370/235 |
| 2011/0128907 A1* | 6/2011 | Kvernvik | 370/328 |
| 2011/0145895 A1* | 6/2011 | Zhang et al. | 726/4 |
| 2011/0167471 A1* | 7/2011 | Riley et al. | 726/1 |
| 2011/0191482 A1* | 8/2011 | Przybysz | H04L 12/14 709/228 |
| 2012/0052866 A1* | 3/2012 | Froehlich | H04L 47/14 455/445 |

FOREIGN PATENT DOCUMENTS

| | | | |
|---|---|---|---|
| CN | 101895856 A | 11/2010 | |
| CN | 101895856 A1 * | 11/2010 | H04W 4/24 |
| CN | 101998323 A | 3/2011 | |
| WO | WO 2009132700 A1 | 11/2009 | |
| WO | WO 2010112080 A1 | 10/2010 | |
| WO | WO 2010145717 A1 | 12/2010 | |

OTHER PUBLICATIONS

"3$^{rd}$ Generation Partnership Project; Technical Specification Group Services and System Aspects; Policy and charging control architecture (Release 11)," 3GPP TS 23.203, V11.1.0, pp. 1-136, 3$^{rd}$ Generation Partnership Project, Valbonne, France (Mar. 2011).

"3$^{rd}$ Generation Partnership Project; Technical Specification Group Core Network and Terminals; Policy and Charging Control over Gx reference point (Release 11)," 3GPP TS 29.212, V11.0.1, pp. 1-132, 3$^{rd}$ Generation Partnership Project, Valbonne, France (Mar. 2011).

* cited by examiner

REDIRECTION METHOD AND REDIRECTION APPARATUS UNDER POLICY AND CHARGING CONTROL

CROSS-REFERENCE TO RELATED APPLICATION

This application is a continuation of International Patent Application No. PCT/CN2012/076342, filed on May 31, 2012, which claims priority to Chinese Patent Application No. 201110150113.6, filed on Jun. 3, 2011, both of which are hereby incorporated by reference in their entireties.

FIELD OF THE INVENTION

This invention relates to the field of communication technology, and particularly, to a redirection method and a redirection apparatus under policy and charging control (PCC).

BACKGROUND OF THE INVENTION

The PCC architecture mainly includes functional entities such as Policy and Charging Enforcement Function (PCEF), Policy and Charging Rule Function (PCRF), Application Function (AF), Online Charging System (OCS), Subscription Profile Repository (SPR), etc.

Under the PCC architecture, when a user goes online and accesses a service, the PCEF requests a service control policy for the user from the PCRF, and after the SPR acquires subscription service information corresponding to the user, the PCRF issues corresponding policy to the PCEF according to the subscription service information. Next, the PCEF interacts with the OCS according to the acquired policy, and the OCS charges the user's online. Meanwhile, the PCEF reports the amount of the service used by the user to the PCRF in real time, so as to decide a policy again.

When the user's policy is changed, the PCRF will timely issue the changed policy to the PCEF, and then the PCEF can redirect a subsequent service flow to a designated server by using a locally and statically configured redirection policy. Or, when the user's balance is insufficient or the user owes fees, the OCS will also issue a redirection rule to the PCEF so that the PCEF redirects the subsequent service flow.

However, in the process of implementing the present invention, the inventor finds that the application scenarios of the redirection method in the prior art are very limited, and particularly, in a case where a user having a data card while having no mobile phone cannot be notified of the current service status in the form of Short Message Service (SMS), the prior art still has no solution for timely notifying the user of the current service status, which influences the user's service experience upon the user using the service.

SUMMARY OF THE INVENTION

The embodiments of the present invention provide a redirection method and a redirection apparatus under policy and charging control, so as to enhance the user's service experience.

The embodiments of the present invention adopt the following technical solutions:

A redirection method under Policy and Charging Control (PCC), comprising:

acquiring a user's service status change information and current scenario information;

determining whether to issue a redirection task to a Policy and Charging Enforcement Function (PCEF) according to the current scenario information;

when a redirection task needs to be issued to the PCEF, generating a redirection indication message according to the service status change information and the current scenario information, wherein the redirection indication message comprises redirection indication information; and sending the redirection indication message to the PCEF, so that the PCEF performs a redirection operation according to the redirection indication information in the redirection indication message.

A redirection method under Policy and Charging Control (PCC), comprising:

sending a user's service status change information to a Policy and Charging Rule Function (PCRF);

receiving from the PCRF a redirection indication message comprising redirection indication information, wherein the redirection indication message is generated by the PCRF according to the service status change information and the current scenario information when the PCRF determines that a redirection task needs to be issued; and performing a redirection operation according to the redirection indication information in the redirection indication message.

A redirection apparatus, comprising:

an information acquiring unit configured to acquire a user's service status change information and current scenario information;

a policy deciding unit configured to determine whether to issue a redirection task to a Policy and Charging Enforcement Function (PCEF) according to the current scenario information;

an information generating unit configured to generate a redirection indication message comprising redirection indication information according to the service status change information and the current scenario information, when a redirection task needs to be issued to the PCEF; and an information sending unit configured to send the redirection indication message to the PCEF, so that the PCEF performs a redirection operation according to the redirection indication information in the redirection indication message.

A redirection apparatus, comprising:

an information sending unit configured to send a user's service status change information to a Policy and Charging Rule Function (PCRF);

an information receiving unit configured to receive from the PCRF a redirection indication message comprising redirection indication information, wherein the redirection indication message is generated by the PCRF according to the service status change information and the current scenario information when the PCRF determines that a redirection task needs to be issued; and an operating unit configured to perform a redirection operation according to the redirection indication information in the redirection indication message.

The redirection method and the redirection apparatus under PCC according to the embodiments of the present invention acquire a user's service status change information and current scenario information, determine whether to issue a redirection task according to the current scenario information, and when a redirection task needs to be issued to the PCEF, generate a redirection indication message according to the service status change information and the current scenario information, and send the redirection indication message to the PCEF. As can be seen that in the embodiments of the present invention, the PCRF determines a corresponding redirection task issuing policy and generates a corresponding redirection indication message according to the scenario information in the service operation process, and at the same time through the redirection indication information in the redirection indication message, indicates the PCEF to perform a redirection operation according to the redirection indication information in the redirection indication message. Thus, when the user accesses the HyperText Transfer Protocol (HTTP) service, the current webpage can be redirected to a designated information prompt page through a redirection operation, so that the user's service usage details can be timely presented in the form of HTTP webpage when the user uses the service, and the user can acquire the service usage details in real-time. Thus, through the method and apparatus according to the embodiments of the present invention, the user can be timely notified of the current service status, thereby improving the user's service usage experience.

BRIEF DESCRIPTION OF THE DRAWINGS

In order to more clearly describe the technical solutions of the embodiments of the present invention, the drawings to be used in the descriptions of the embodiments are briefly introduced as follows. Obviously, the following drawings just illustrate some embodiments of the present invention, and a person skilled in the art can obtain other drawings from these drawings without paying any creative effort.

DETAILED DESCRIPTION OF THE PREFERRED EMBODIMENTS

The technical solutions of the embodiments of the present invention will be clearly and completely described as follows in conjunction with the drawings in the embodiments of the present invention. Obviously, those embodiments described herein are just parts of the embodiments of the present invention rather than all the embodiments. Based on the embodiments of the present invention, any other embodiment obtained by a person skilled in the art without paying any creative effort shall fall within the protection scope of the present invention.

Figure 1:
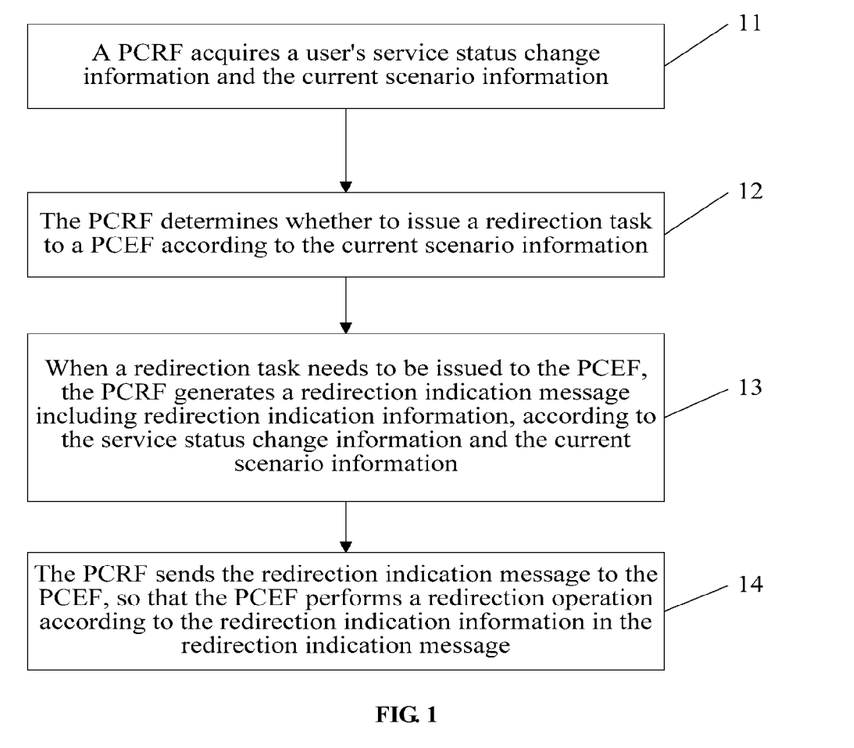
FIG. 1 is a flowchart of a redirection method under PCC according to Embodiment 1 of the present invention.

As illustrated in FIG. 1, a redirection method under PCC according to Embodiment 1 of the present invention includes:

Step 11: a PCRF acquires a user's service status change information and the current scenario information.

In this embodiment, the service status change information includes at least one of the following information: the user goes online, the user's session is updated, the user's subscription or status is changed, and the user ends the session. Accordingly, in this step, the PCRF acquires the user's different service status change information in different ways, for example:

receiving a creation initial policy request and user information sent by the PCEF when the user goes online, so as to acquire the user's service status change information;

receiving an update policy request and service change information sent by the PCEF when the user's session is updated, so as to acquire the user's service status change information;

receiving service change information sent by an SPR when the user's subscription or status is changed, so as to acquire the user's service status change information; and receiving a CCRT message sent by the PCEF when the user ends the session, and receiving the creation initial policy request and the user information sent by the PCEF when the PCEF initiates a session again for the user, so as to acquire the user's service status change information.

The PCRF may acquire the current scenario information according to the usage status of the user's current service. In which, the current scenario information may include at least one of the following information:

the user information is changed, the network status is changed, the quality of a user requested service is changed, the quality of a user authorized service is changed, the user's charging mode is changed, the user's package quota and used amount are changed, and the quota and used amount of a group to which the user belongs are changed.

In which, the user information includes, but not limited to, user's contracting status (e.g., owed, locked, black listed, white listed), user's brand, information of a group to which the user belongs, status of a package to which the user subscribes. The network status includes position, time, Access Point Name (APN), SERVICING GPRS SUPPORT NODE (GPRS) address, network type, bandwidth, number of visitors, etc.

Step 12: the PCRF determines whether to issue a redirection task to a PCEF according to the current scenario information.

The PCRF determines that a redirection task needs to be issued to the PCEF when the current scenario information is at least one of the information described in step 11, and determines that a redirection task needs not to be issued to the PCEF when the current scenario information is not any one of the information described in step 11.

Step 13: when a redirection task needs to be issued to the PCEF, the PCRF generates a redirection indication message including redirection indication information, according to the service status change information and the current scenario information.

In which, the redirection indication information indicates a specific rule for the PCEF to perform a redirection operation according to the redirection indication message. Specifically, in this embodiment, the PCRF determines the value of each parameter in the redirection indication information according to the service status change information and the current scenario information. The redirection indication information having each parameter set with corresponding value is carried in an indication message which is taken as the redirection indication message. For example, the indication message may be a Credit-Control-Answer (CCA) message.

Step 14: the PCRF sends the redirection indication message to the PCEF, so that the PCEF performs a redirection operation according to the redirection indication information in the redirection indication message.

In Embodiment 1 of the present invention, the PCRF determines a corresponding redirection task issuing policy and generates a corresponding redirection indication message according to the scenario information in the service operation process, and at the same time through the redirection indication information in the redirection indication message, indicates the PCEF to perform a redirection operation according to the redirection indication information in the redirection indication message. Thus, when the user accesses the HTTP service, the current webpage can be redirected to a designated information prompt page through a redirection operation, so that the user's service usage details can be timely presented in the form of HTTP webpage. Therefore, through the method according to Embodiment 1 of the present invention, the user can be timely notified of the current service status, thereby improving the user's service usage experience.

Figure 2:
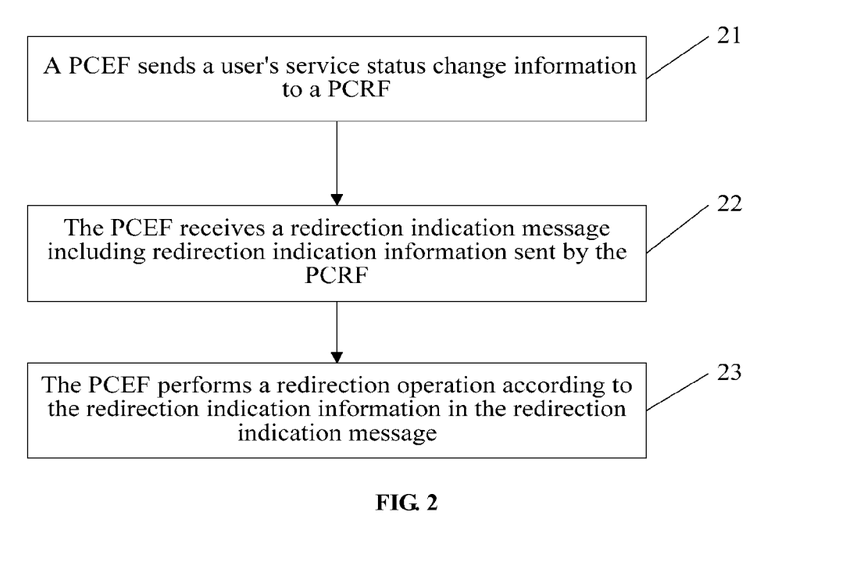
FIG. 2 is a flowchart of a redirection method under PCC according to Embodiment 2 of the present invention.

As illustrated in FIG. 2, a redirection method under PCC according to Embodiment 2 of the present invention includes:

Step 21: a PCEF sends a user's service status change information to a PCRF.

When the user's service status is changed, the PCEF sends to the PCRF the user's service status change information, e.g., the user goes online, the user's session is updated, the user's subscription or status is changed, the user ends the session, etc. When the user goes online, the PCEF sends a creation initial policy request and user information to the PCRF; when the user's session is updated, the PCEF sends an update policy request and service change information to the PCRF; and when the user ends the session, the PCEF sends a CCRT message to the PCRF, and sends the creation initial policy request and the user information to the PCRF when initiating a session again for the user.

Step 22: the PCEF receives a redirection indication message including redirection indication information sent by the PCRF, wherein the redirection indication message is generated by the PCRF according to the service status change information and the current scenario information when the PCRF determines that a redirection task needs to be issued to the PCEF. Please refer to the description of Embodiment 1 for the detailed process in which the PCRF determines whether to issue a redirection task to the PCEF.

Step 23: the PCEF performs a redirection operation according to the redirection indication information in the redirection indication message.

Specifically, in this step, the PCEF parses the redirection indication message, acquires the redirection indication information, and redirects the webpage currently accessed by the user to a designated information prompt page according to the redirection indication information.

In Embodiment 2 of the present invention, the PCRF determines a corresponding redirection task issuing policy and generates a corresponding redirection indication message according to the scenario information in the service operation process, and at the same time through the redirection indication information in the redirection indication message, indicates the PCEF to perform a redirection operation according to the redirection indication information in the redirection indication message. Thus, when the user accesses the HTTP service, the current webpage can be redirected to a designated information prompt page through a redirection operation, so that the user's service usage details can be timely presented to the user in a form of HTTP webpage when the user uses the service, and the user can acquire the service usage details in real-time. Therefore, through the method according to Embodiment 2 of the present invention, the PCEF performs corresponding redirection operation in time according to the instruction from the PCRF, so as to timely notify the user of current service status, thereby improving the user's service usage experience.

In this embodiment of the present invention, in order that the PCRF timely informs the PCEF to perform a redirection operation, the Gx interface is extended and added with a redirection control policy. In which, the Gx interface protocol is revised as follows:

1) In the attribute-value pairs (AVP) of Charging-Rule-Install, the following definition of AVP is added:

Charging-Rule-Install::=
  Notify-Rule-Definition
  .. (other existing AVP)

wherein, Notify-Rule-Definition AVP is the AVP of a newly added combination, for defining a redirection task. The definition is:

Notify-Rule-Definition::=
  {Notify-Rule-Name}
  {Service-Id}
  {Redirect-Server}
  {Redirect-Times}
  [Redirect-Report-Enable]
  [Redirect-Revalidate-Time]
  [Redirection-Parameter-Method]
  *[Redirection-Parameter-Information]
    {Redirect-Parameter-Name}
    {Redirect- Parameter-Value} wherein, Notify-Rule-Name uniquely identifies a redirection task;

Service-Id represents a service flow for which the redirection is made, and it may be defined through protocol/Uniform Resource Locator (URL)/IP: Port, etc. For example, the protocol may be an application or a protocol that supports the redirection function, such as the HTTP protocol.

Redirect-Server identifies a redirection server. The parameter is the AVP in a reusable Gy interface, and its Redirect-Address-Type is fixed to 2: URL.

Redirect-Times represents the number of times of redirections, which is valued as (0, 1, 2), wherein 0 indicates that for a protocol designated by the Service-Id, the PCEF always performs a redirection when receiving a packet each time; 1 indicates that the PCEF performs a redirection once after receiving a redirection task, and later releases; and 2 indicates that the PCEF performs a redirection each time the user goes online and makes an initial access, and subsequently releases.

Redirect-Report-Enable indicates whether the PCEF shall report a performance status of the redirection task, which is valued as (0, 1), wherein 0 indicates that the performance status of the redirection task needs not to be reported, and 1 indicates that the performance status of the redirection task needs to be reported.

Redirect-Revalidate-Time represents indicating the PCEF to report the performance result of the redirection task within a specified time limit, regardless of whether the redirection task is performed.

Redirection-Parameter-Method represents an attach mode when parameters are transferred to the redirection server, which is valued as (0, 1), wherein 0 indicates to transfer the parameters in the header field of the protocol, and 1 indicates to attach them to the parameters of the URL.

Redirection-Parameter-Information represents the parameters transferred to the redirection server, including Redirect- Parameter-Name and Redirect-Parameter-Value, wherein Redirect-Parameter-Name is the parameter name and Redirect-Parameter-Value is the parameter value.

2) In Charging-Rule-Remove AVP, the following definition of AVP is added:

```
Charging-Rule-Install::=
    Notify-Rule-Name
    .. (Other existing AVP)
```

Notify-Rule-Name uniquely identifies that the information is used to remove the user's current redirection policy.

3) In Charging-Rule-Report AVP, the following definition of AVP is added:

```
Charging-Rule-Report ::=
    Notify-Rule-Name
    Notify-Rule-Status (0: Performed, 1: No performed)
``` wherein, Notify-Rule-Name uniquely identifies that the information is used to report a performance result of the redirection task;

Notify-Rule-Status represents the performance result of the redirection task, which is valued as (0, 1), wherein 0 indicates 'performed', and 1 indicates 'not performed'.

According to the above extended Gx interface protocol, the redirection indication information may be carried through Charging-Rule-Install, the performance result report information is carried through Charging-Rule-Report, and the policy remove information is carried through Charging-Rule-Remove.

The implementation process of the method according to the embodiment of the present invention will be detailedly described as follows in conjunction with different extensions of the Gx interface and different service status change information.

(I) The User Goes Online and the PCEF Creates a User Session

Figure 3:
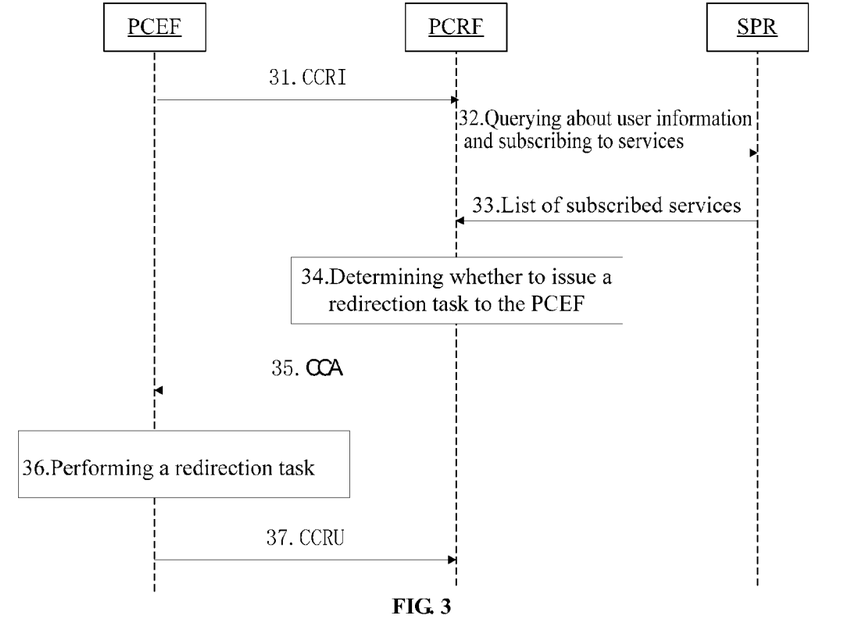
FIG. 3 is a schematic diagram of a redirection process in which a PCEF creates a user session in an embodiment of the present invention.

As illustrated in FIG. 3, the redirection process in which the PCEF creates a user session mainly includes:

Step 31: when the user goes online, the PCEF sends a Credit-Control-Request Initial (CCRI) to the PCRF and reports user information at the same time, wherein the user information may include the user's user ID, the network type, etc.

Step 32: the PCEF queries the SPR about the user information and subscribes to the services.

Step 33: the SPR returns a list of the user's subscribed services to the PCRF.

Step 34: the PCRF acquires the current scenario information, and determines whether to issue a redirection task to the PCEF.

In which, the PCRF will determine to issue a redirection task to the PCEF if the current scenario includes one of the following scenarios: the user information is changed, the network status is changed, the quality of a user requested service is changed, the quality of a user authorized service is changed, the user's charging mode is changed, the user's package quota and used amount are changed, and the quota and used amount of a group to which the user belongs are changed.

Of course, the scenarios listed herein are just examples, and in specific applications other scenario information may be added upon demand, so as to determine to issue a redirection task to the PCEF.

Step 35: if the PCRF determines that a redirection task needs to be issued to the PCEF, it issues a redirection indication message to the PCEF.

In this embodiment, the redirection indication message may be a Credit-Control-Answer (CCA) message. When the redirection indication message is generated, the PCRF determines corresponding parameter value based on the type of the redirection task and information acquired by PCEF/SPR/Application Function (AF), etc., and uses the redirection indication information to indicate a specific rule for the PCEF to perform a redirection operation according to the redirection indication message. In which, the redirection indication information uses a structure of Notify-Rule-Definition in the above described Charging-Rule-Install.

Step 36: the PCEF performs a redirection task according to the redirection indication message.

Step 37: when the redirection indication information requires the PCEF to report the performance result of the redirection task, the PCEF sends to the PCRF a redirection result report message which includes redirection result report information.

In which, the redirection result report message may be a Credit-Control-Request update (CCRU) message, and the redirection result report information may use the structure of Charging-Rule-Report.

In addition, the PCRF may judge whether to notify the user in other forms according to the result reported by the PCEF, e.g., a form of Short Message Service (SMS) may be employed for a user who can receive short messages.

For example, in this embodiment, the redirection indication information is defined as follows:

```
Notify-Rule-Definition::=
    {Notify-Rule-Name} -unsubscription notification
    (unsubscription prompt)
    {Service-Id} -P2P services (accessing P2P when no P2P-related package is subscribed to)
    {Redirect-Server} - http://productadvice.mobile.com (recommendation portal of products to be subscribed to)
    {Redirect-Times} - 0 - always to redirect
    [Redirect-Report-Enable] -1 (reporting the performance status of the redirection task)
    [Redirection-Parameter-Method]
    *[Redirection-Parameter-Information]
            {Redirect-Parameter-Name} -UID (user ID)
            {Redirect- Parameter-Value} - 111111
    *[Redirection-Parameter-Information]
            {Redirect-Parameter-Name} -ProductID (user's package ID)
            {Redirect- Parameter-Value} -2M packet 2G bandwidth post-paid user
```

The redirection result report information is defined as follows:

```
Charging-Rule-Report ::=
    Notify-Rule-Name = usage notification (traffic prompt,
which is consistent with that in the definition)
    Notify-Rule-Status = 0: Performed (having been performed)
```

(II) The User's Session is Updated, and the PCEF Updates the User Session

Figure 4:
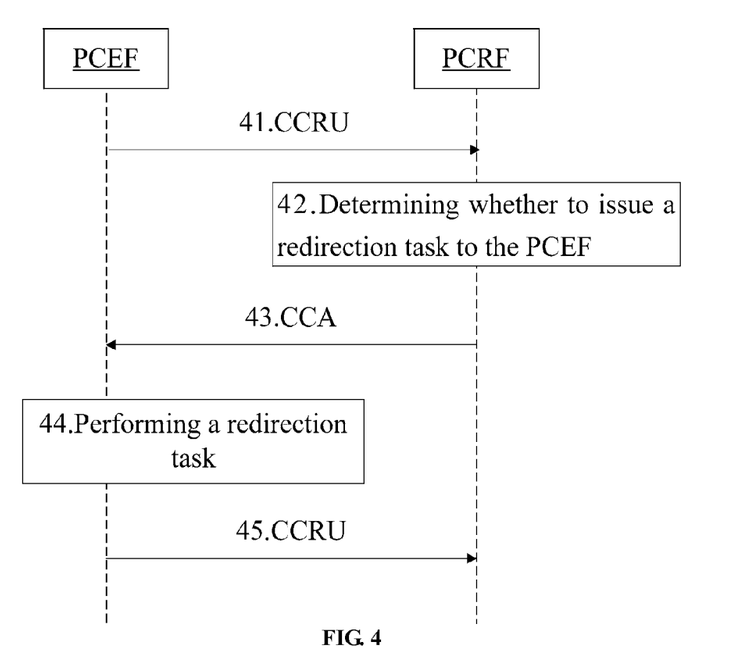
FIG. 4 is a schematic diagram of a redirection process in which a PCEF updates user's session.

As illustrated in FIG. 4, the redirection process in which the PCEF updates a user session mainly includes:

Step 41: when a user session is to be updated, the PCEF sends an update policy request (e.g., CCRU) to the PCEF, and reports service change information. In which, the update of the user session may be also be caused as corresponding event issued by the PCRF is triggered.

Step 42: the PCRF determines whether to issue a redirection task to the PCEF according to the service change information and current scenario information.

In which, the PCRF will determine to issue a redirection task to the PCEF if the current scenario includes one of the following scenarios: the user information is changed, the network status is changed, the quality of a user requested service is changed, the quality of a user authorized service is changed, the user's charging mode is changed, the user's package quota and used amount are changed, and the quota and used amount of a group to which the user belongs are changed.

Of course, the scenarios listed herein are just examples, and in specific applications other scenario information may be added upon demand, so as to determine to issue a redirection task to the PCEF.

Step 43: if the PCRF determines that a redirection task needs to be issued to the PCEF, it issues a redirection indication message to the PCEF.

In this embodiment, the redirection indication message may be a CCA message. When the redirection indication message is generated, the PCRF determines corresponding parameter value based on the type of the redirection task and information acquired by PCEF/SPR/AF, etc., and uses the redirection indication information to indicate a specific rule with which the PCEF to perform a redirection operation according to the redirection indication message. In which, the redirection indication information uses a structure of Notify-Rule-Definition in the above described Charging-Rule-Install.

In addition, the redirection indication message may further include: policy remove information for indicating the PCEF to remove the user's current redirection policy. In which, the policy remove information may use the structure of the above described Charging-Rule-Remove.

Step 44: the PCEF performs a redirection task according to the redirection indication message.

Step 45: when the redirection indication information requires the PCEF to report the performance result of the redirection task, the PCEF sends to the PCRF a redirection result report message which includes redirection result report information.

In which, the redirection result report message may be a CCRU message, and the redirection result report information may use the structure of Charging-Rule-Report.

For example, in this embodiment, the redirection indication information is defined as follows:

```
Notify-Rule-Definition::=
    {Notify-Rule-Name} -usage notification (traffic prompt)
    {Service-Id} -* for all services
    {Redirect-Server} - http://productadvice.mobile.com
(recommendation portal of turbo products)
    {Redirect-Times} - 2 - prompting when the user initially goes
    online
    [Redirect-Report-Enable] -1 (whether a redirection operation is
    performed)
    [Redirection-Parameter-Method]
    *[Redirection-Parameter-Information]
        {Redirect-Parameter-Name} -UID (user ID)
        {Redirect- Parameter-Value} - 111111
    *[Redirection-Parameter-Information]
        {Redirect-Parameter-Name} -UsagedUsage (used
        traffic volume)
        {Redirect- Parameter-Value} -2G
```

-continued

```
*[Redirection-Parameter-Information]
        {Redirect-Parameter-Name} -RatingBefore (previous
        rate)
        {Redirect- Parameter-Value} -RatingGroup0 (free)
    *[Redirection-Parameter-Information]
        {Redirect-Parameter-Name} -RatingAfter (later rate)
        {Redirect- Parameter-Value} -RatingGroup1 ($2/Mb)
    *[Redirection-Parameter-Information]
        {Redirect-Parameter-Name} -ProductID (user's
        package ID)
        {Redirect- Parameter-Value} -2M packet 2G
        bandwidth post-paid user
```

The redirection result report information is defined as follows:

```
Charging-Rule-Report ::=
    Notify-Rule-Name = usage notification (traffic prompt,
which is consistent with that in the definition)
    Notify-Rule-Status = 0:Performed (having been
    performed)
```

The policy remove information is defined as follows:

```
Charging-Rule-Remove::=
    Notify-Rule-Name = usage notification (traffic prompt,
which is consistent with that in the definition)
```

(III) The User Subscription and/or Status is Changed

Figure 5:
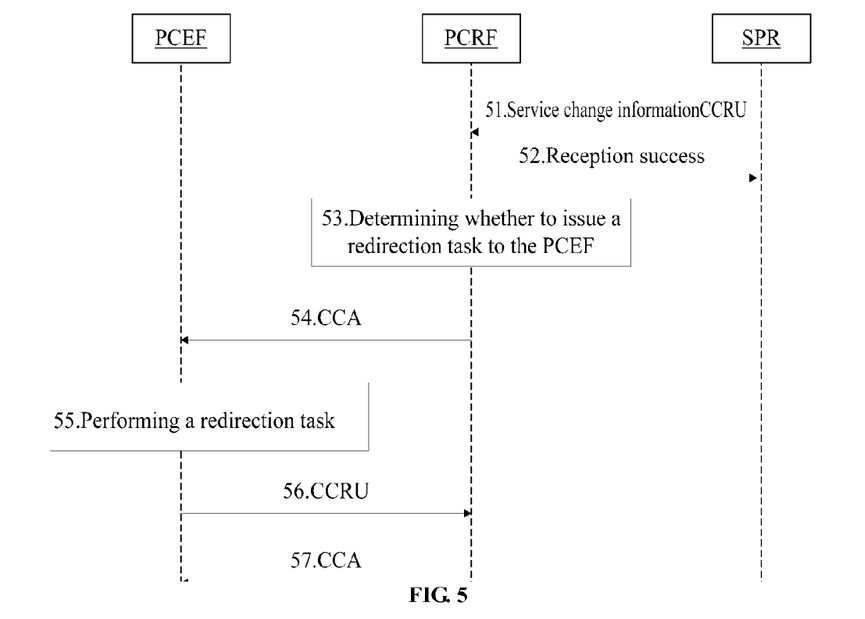
FIG. 5 is a schematic diagram of a redirection process in which a user subscription and/or status is changed in an embodiment of the present invention.

As illustrated in FIG. 5, the redirection process in which the user subscription and/or status is changed mainly includes:

Step 51: when the user subscription and/or status is changed, the SPR sends service change information to the PCRF, so as to notify the PCRF that the user subscription and/or status is changed.

Step 52: the PCRF sends a reception success message to the SPR.

Step 53: the PCRF determines whether to issue a redirection task to the PCEF according to the service change information and the current scenario information.

In which, the PCRF will determine to issue a redirection task to the PCEF if the current scenario includes one of the following scenarios: the user information is changed, the network status is changed, the quality of a user requested service is changed, the quality of a user authorized service is changed, the user's charging mode is changed, the user's package quota and used amount are changed, and the quota and used amount of a group to which the user belongs are changed.

Step 54: if the PCRF determines that a redirection task needs to be issued to the PCEF, it issues a redirection indication message to the PCEF.

In this embodiment, the redirection indication message may be a CCA message. When the redirection indication message is generated, the PCRF determines corresponding parameter value based on the type of the redirection task and information acquired by PCEF/SPR/AF, etc., and uses the redirection indication information to indicate a specific rule for the PCEF to perform a redirection operation according to the redirection indication message. In which, the redirection indication information uses a structure of Notify-Rule-Definition in the above described Charging-Rule-Install.

In addition, the redirection indication message may further include: policy remove information for indicating the PCEF to remove the user's current redirection policy. In which, the policy remove information may use the structure of the above described Charging-Rule-Remove.

Step 55: the PCEF performs a redirection task according to the redirection indication message.

Step 56: when the redirection indication information requires the PCEF to report the performance result of the redirection task, the PCEF sends to the PCRF a redirection result report message which includes redirection result report information.

In which, the redirection result report message may be a CCRU message, and the redirection result report information may use the structure of Charging-Rule-Report.

In addition, the PCRF may judge whether to notify the user in other forms according to the result reported by the PCEF, e.g., a form of SMS may be employed.

Step 57: the PCRF sends a CCA message to the PCEF.

For example, in this embodiment, the redirection indication information is defined as follows:

```
Notify-Rule-Definition::=
    {Notify-Rule-Name} -subscription notification (subscription prompt)
    {Service-Id} -P2P services (subscription prompt for P2P package)
    {Redirect-Server} - http://subscriptionnoitify.mobile.com
    (subscription portal)
    {Redirect-Times} - 2 - prompting when the user initially goes online
    [Redirect-Report-Enable] -1 (whether a redirection operation is
    performed)
     Redirect-Revalidate-Time] = 600000 (must report 10 minutes later)
    [Redirection-Parameter-Method]
    *[Redirection-Parameter-Information]
            {Redirect-Parameter-Name} -UID (user ID)
            {Redirect- Parameter-Value} - 111111
*[Redirection-Parameter-Information]
            {Redirect-Parameter-Name} -ProductID (user's package
            ID)
            {Redirect- Parameter-Value} -2M packet 2G bandwidth
            post-paid user
```

The redirection result report information is defined as follows:

```
Charging-Rule-Report ::=
        Notify-Rule-Name = subscription notification (subscription
prompt, which is consistent with that in the definition)
        Notify-Rule-Status = 1:Not Performed (not performed)
```

The policy remove information is defined as follows:

```
Charging-Rule-Remove::=
        subscription notification (subscription prompt, which
is consistent with that in the definition)
```

(IV) The User Ends the Session, and the PCEF Ends the User Session

Figure 6:
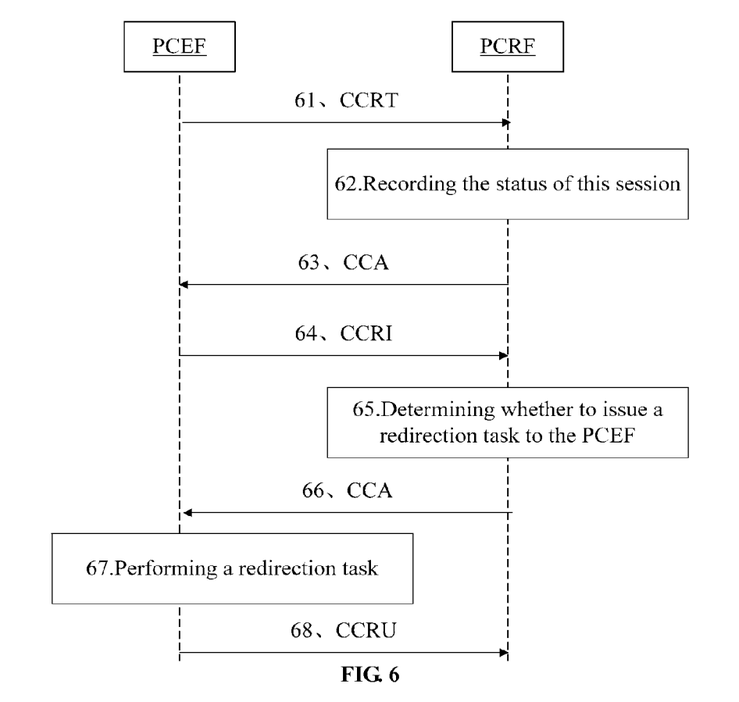
FIG. 6 is a schematic diagram of a redirection process in which a PCEF ends a user session in an embodiment of the present invention.

As illustrated in FIG. 6, the redirection process in which the PCEF ends the user session mainly includes:

Step 61: the PCEF ends the user session and reports information such as the user's used traffic volume through a Credit-Control-Request Terminate (CCRT) message.

Step 62: the PCRF may record the user's access information of the present session, and generates a previous action prompt redirection task to be performed when the user goes online next time.

Step 63: the PCRF sends a CCA message to the PCEF, and determines the CCRT processing result.

Step 64: the PCEF initiates a new access session for the same user, and sends a CCRI message to the PCRF.

Step 65: the PCRF determines whether to issue a redirection task to the PCEF according to the current scenario information.

In which, the PCRF will determine to issue a redirection task to the PCEF if the current scenario includes the following scenario, e.g., the access record of the last time shall be prompted to the user.

In which, the PCRF will determine to issue a redirection task to the PCEF if the current scenario includes the following scenario, e.g., the access record of the last time shall be prompted to the user.

Step 66: if the PCRF determines that a redirection task needs to be issued to the PCEF, it issues a redirection indication message to the PCEF.

In this embodiment, the redirection indication message may be a CCA message. When the redirection indication message is generated, the PCRF determines corresponding parameter value based on the type of the redirection task and information acquired by PCEF/SPR/AF, etc., and uses the redirection indication information to indicate a specific rule for the PCEF to perform a redirection operation according to the redirection indication message. In which, the redirection indication information uses a structure of Notify-Rule-Definition in Charging-Rule-Install.

Step 67: the PCEF performs a redirection task according to the redirection indication message.

Step 68: when the redirection indication information requires the PCEF to report the performance result of the redirection task, the PCEF sends to the PCRF a redirection result report message which includes redirection result report information.

In which, the redirection result report message may be a CCRU message, and the redirection result report information may use the structure of Charging-Rule-Report.

For example, in this embodiment, the redirection indication information is defined as follows:

```
Notify-Rule-Definition::=
    {Notify-Rule-Name} -LastLoginnotification (last login prompt)
    {Service-Id} -* services (prompt is triggered when any service is
    accessed)
    {Redirect-Server} - http://historynoitify.mobile.com (last login
    prompt portal)
    {Redirect-Times} - 2 - prompting when the user initially goes
    online
    [Redirect-Report-Enable] -1 (reporting the performance status of
the redirection task)
    [Redirection-Parameter-Method]
    *[Redirection-Parameter-Information]
            {Redirect-Parameter-Name} -UID (user ID)
            {Redirect- Parameter-Value} - 111111
    *[Redirection-Parameter-Information]
            {Redirect-Parameter-Name} -StartTime (start time
            of last access)
            {Redirect- Parameter-Value} -20110511190001
    *[Redirection-Parameter-Information]
            {Redirect-Parameter-Name} -EndTime (end time of
            last access)
            {Redirect- Parameter-Value} -20110511220001
    *[Redirection-Parameter-Information]
            {Redirect-Parameter-Name} -trafficvolume
(traffic volume of last access)
            {Redirect- Parameter-Value} -500M
```

The redirection result report information is defined as follows:

```
Charging-Rule-Report ::=
    Notify-Rule-Name = LastLoginnotification (last login
prompt, which is consistent with that in the definition)
    Notify-Rule-Status = 1:Not Performed (not performed)
```

As can be seen from the above descriptions, in the redirection method under PCC according to the embodiment of the present invention, the redirection policy decision is uniformly defined, the repeated construction of the multi-point PCEF is avoided, and corresponding transformed points are reduced. In addition, many notification scenarios in the data service operation process are flexibly realized based on the standard framework of PCC. The PCRF determines a corresponding redirection task issuing policy and generates a corresponding redirection indication message according to the scenario information in the service operation process, and at the same time through the redirection indication information in the redirection indication message, indicates the PCEF to perform a redirection operation according to the redirection indication information in the redirection indication message. Thus, when the user accesses the HTTP service, the current webpage can be redirected to a designated information prompt page through a redirection operation, so that the user's service usage details can be timely presented in the form of HTTP webpage, and the user can acquire the service usage details in real-time. Particularly, under the condition that the SMS notification cannot be carried out for a user having a data card while having no mobile phone, the user's final service usage details can be timely presented in the form of HTTP webpage, which improves the user's service experience.

Figure 7:
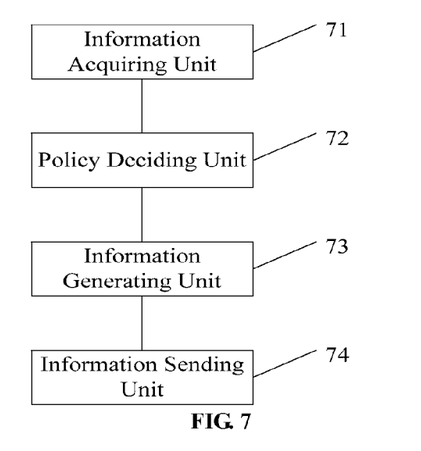
FIG. 7 is a schematic diagram of a redirection apparatus according to Embodiment 3 of the present invention.

As illustrated in FIG. 7, Embodiment 3 of the present invention further provides a redirection apparatus, including:

an information acquiring unit 71 configured to acquire a user's service status change information and the current scenario information; a policy deciding unit 72 configured to determine whether to issue a redirection task to a PCEF according to the current scenario information; an information generating unit 73 configured to generate a redirection indication message including redirection indication information according to the service status change information and the current scenario information, when a redirection task needs to be issued to the PCEF; and an information sending unit 74 configured to send the redirection indication message to the PCEF, so that the PCEF performs a redirection operation according to the redirection indication information in the redirection indication message.

Being identical to the above described method embodiment, in this embodiment, the service status change information includes at least one of the following statuses: the user goes online, the user's session is updated, the user's subscription or status is changed, and the user ends the session. Depending on the different contents included in the service status, when acquiring the user's service status change information, the information acquiring unit 71 is specifically configured to receive a creation initial policy request and user information sent by the PCEF when the user goes online; or receive an update policy request and service change information sent by the PCEF when the user's session is updated; or receive service change information sent by an SPR when the user's subscription or status is changed; or receive a CCRT message sent by the PCEF when the user ends the session, and receive the creation initial policy request and the user information sent by the PCEF when the PCEF initiates a session again for the user.

In which, when the service status change information is that the user's session is updated, or the user's subscription or status is changed, the redirection indication message further includes policy remove information for indicating the PCEF to remove the user's current redirection policy.

In addition, the apparatus according to the embodiment of the present invention may further include: a receiving unit configured to receive from the PCEF a redirection result report message including redirection result report information.

In which, the policy deciding unit 72 is specifically configured to determine that a redirection task needs to be issued to the PCEF when the current scenario information is any one of the following information, otherwise determine that a redirection task needs not to be issued to the PCEF.

The information includes: the user information is changed, the network status is changed, the quality of a user requested service is changed, the quality of a user authorized service is changed, the user's charging mode is changed, the user's package quota and used amount are changed, and the quota and used amount of a group to which the user belongs are changed.

The information generating unit 73 may include: a determining module configured to determine the value of each parameter in the redirection indication information according to the service status change information and the current scenario information; and a generating module configured to carry the redirection indication information having each parameter set with corresponding value through an indication message which is taken as the redirection indication message.

In this embodiment, the redirection indication information, the redirection result report information and the redirection result report information may adopt the structures described in the above embodiments.

In the embodiment of the present invention, the redirection apparatus determines a redirection task issuing policy and generates a corresponding redirection indication message according to the scenario information in the service operation process, and at the same time through the redirection indication information in the redirection indication message, indicates the PCEF to perform a redirection operation according to the redirection indication information in the redirection indication message. Thus, when the user accesses the HTTP service, the current webpage can be redirected to a designated information prompt page through a redirection operation, so that the user's service usage details can be timely presented in the form of HTTP webpage when the user uses the service, and the user can acquire the service usage details in real-time. Therefore, through the redirection apparatus according to the embodiment of the present invention, the user can be timely notified of the current service status, thereby improving the user's service usage experience.

The redirection apparatus as illustrated in FIG. 7 can be located in the PCRF, please refer to the description of the method embodiment for its working principle.

Figure 8:
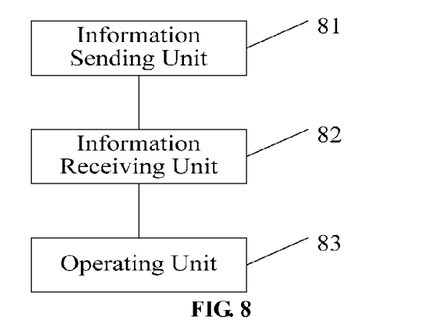
FIG. 8 is a schematic diagram of a redirection apparatus according to Embodiment 4 of the present invention.

As illustrated in FIG. 8, Embodiment 4 of the present invention further provides a redirection apparatus, including:

an information sending unit 81 configured to send a user's service status change information to a PCRF; an information receiving unit 82 configured to receive from the PCRF a redirection indication message including redirection indication information, wherein the redirection indication message is generated by the PCRF according to the service status change information and the current scenario information when the PCRF determines that a redirection task needs to be issued; and an operating unit 83 configured to perform a redirection operation according to the redirection indication information in the redirection indication message.

In this embodiment, the service status change information includes at least one of the following statuses: the user goes online, the user's session is updated, and the user ends the session. Depending on the content included in the service status, the information sending unit 81 is specifically configured to: send a creation initial policy request and user information to the PCRF when the user goes online; or send an update policy request and service change information to the PCRF when the user's session is updated; or send a CCRT message to the PCRF when the user ends the session, and send the creation initial policy request and the user information to the PCRF when initiating a session again for the user.

In which, the operating unit 83 may include: a parsing module configured to parse the redirection indication message and acquire the redirection indication information; an operating module configured to redirect a webpage currently accessed by the user to a designated information prompt page according to the redirection indication information.

Figure 9:
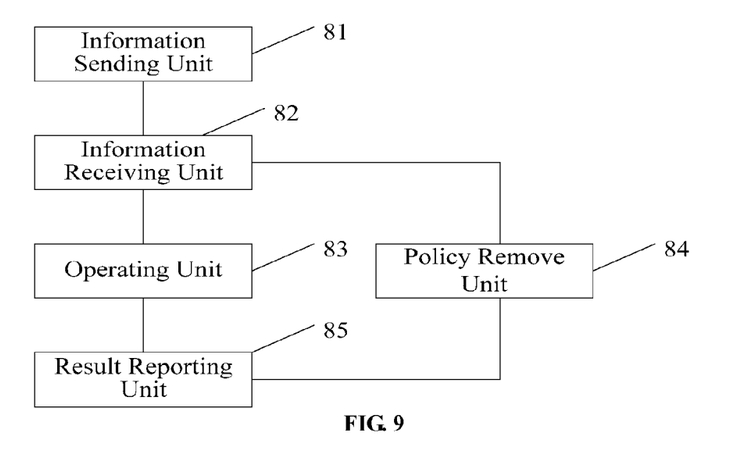
FIG. 9 is a structure diagram of a redirection apparatus according to an embodiment of the present invention.

When the service status change information is that the user's session is updated, the redirection indication message further includes policy remove information for indicating to remove the user's current redirection policy. In that case, as illustrated in FIG. 9, the apparatus further includes: a policy remove unit 84 configured to remove the user's current redirection policy according to the policy remove information. As illustrated in FIG. 9, the apparatus may further include a result reporting unit 85 configured to send to the PCRF a redirection result report message including redirection result report information.

A corresponding redirection task issuing policy is determined and a corresponding redirection indication message is generated according to the scenario information in the service operation process, and at the same time through the redirection indication information in the redirection indication message, the PCEF is indicated to perform a redirection operation according to the redirection indication information in the redirection indication message. Thus, when the user accesses the HTTP service, the current webpage can be redirected to a designated information prompt page through a redirection operation, so that the user's service usage details can be timely presented in the form of HTTP webpage when the user uses the service, and the user can acquire the service usage details in real-time. Therefore, through the redirection apparatus according to Embodiment 4 of the present invention, a corresponding redirection operation can be performed in time according to the instruction from the PCRF, and the user can be timely notified of the current service status, thereby improving the user's service usage experience.

The redirection apparatus as illustrated in FIG. 8 or 9 can be located in the PCEF, please refer to the description of the method embodiment for its working principle.

The redirection apparatus according to the embodiment of the present invention is employed to perform the redirection method according to the embodiment of the present invention, please refer to the relevant description of the method embodiment for its implementation process, and herein is omitted.

A person skilled in the art shall appreciate that all or a part of flows in the methods according to the above embodiments may be implemented by instructing relevant hardware through a computer program that may be stored in a computer readable storage medium, and when being executed, the program includes the flows of the method embodiments. In which, the storage medium may be magnetic disk, optical disk, Read-Only Memory (ROM) or Random Access Memory (RAM), etc.

The above descriptions are just specific embodiments of the present invention, and the protection scope of the present invention is not limited thereto. Any change or substitution easily conceivable to a person skilled in the art within the technical scope disclosed by the present invention shall fall within the protection scope of the present invention. Therefore, the protection scope of the present invention shall be determined by the protection scope of the claims.

What is claimed is:

1. A redirection method under Policy and Charging Control (PCC), comprising:

acquiring service status change information and current scenario information; determining to issue a redirection task to a Policy and Charging Enforcement Function (PCEF) according to the current scenario information;

generating a redirection indication message according to the service status change information and the current scenario information when a redirection task is to be issued to the PCEF, wherein the redirection indication message comprises redirection indication information; and sending the redirection indication message to the PCEF, so that the PCEF performs a redirection operation according to the redirection indication information in the redirection indication message;

wherein said determining whether to issue a redirection task to the PCEF according to the current scenario information comprises:

determining that the redirection task is to be issued to the PCEF when the current scenario information is one or more of the following information:

information related to user information being changed, information related to a network status being changed, information related to a quality of a user requested service being changed, information related to a quality of a user authorized service being changed, information related to the user's charging mode being changed, information related to the user's package quota and used amount being changed, and information related to the quota and used amount of a group to which the user belongs being changed, wherein the service status change information comprises at least one of the following information: information related to a user going online, information related to the user's session being updated, information related to the user's subscription or status being changed, and information related to the user ending the session; and wherein acquiring the service status change information comprises at least one of:

receiving a creation initial policy request and user information sent by the PCEF when the user goes online;

receiving an update policy request and service change information sent by the PCEF when the user's session is updated;

receiving service change information sent by a Subscription Profile Repository (SPR) when the user's subscription or status is changed; and receiving a Credit-Control-Request Terminate (CCRT) message sent by the PCEF when the user ends the session, and receiving the creation initial policy request and the user information sent by the PCEF when the PCEF initiates a session again for the user, wherein said generating the redirection indication message according to the service status change information and the current scenario information comprises:
  determining a value of each parameter in the redirection indication information according to the service status change information and the current scenario information;
  carrying the redirection indication information having each parameter with corresponding value through the indication message which is taken as the redirection indication message.

2. The method according to claim 1, wherein the redirection indication information comprises:
  a Notify-Rule-Name that uniquely identifies the redirection task;
  a Service-Id that represents a service flow for which the redirection is made;
  a Redirect-Server that identifies a redirection server;
  a Redirect-Times that represents the number of times of redirections;
  a Redirect-Report-Enable that indicates whether the PCEF shall report a performance status of the redirection task;
  a Redirect-Revalidate-Time that indicates the PCEF to report the performance status of the redirection task within a specified time limit;
  a Redirection-Parameter-Method that represents an attach mode when parameters are transferred to the redirection server; and
  a Redirection-Parameter-Information that represents the parameters transferred to the redirection server.

3. The method according to claim 1, wherein when the service status change information is that the user's session is updated, or the user's subscription or status is changed,
  the redirection indication message further comprises policy remove information that indicates the PCEF to remove the user's current redirection policy.

4. The method according to claim 1, wherein after sending the redirection indication message to the PCEF, the method further comprises:
  receiving from the PCEF a redirection result report message comprising redirection result report information.

5. The method according to claim 4, wherein the redirection result report information comprises:
  a Notify-Rule-Name that uniquely identifies that the result report information is used to report a performance result of the redirection task; and
  a Notify-Rule-Status that represents the performance result of the redirection task.

6. A redirection method under Policy and Charging Control (PCC), comprising:
  sending service status change information to a Policy and Charging Rule Function (PCRF);
  receiving from the PCRF a redirection indication message comprising redirection indication information, wherein the redirection indication message is generated by the PCRF according to the service status change information and current scenario information when the PCRF determines that a redirection task is to be issued;
  performing a redirection operation according to the redirection indication information in the redirection indication message; and
  sending the PCRF a redirection result report message which includes redirection result report information, when the redirection indication information requires to report the performance result of the redirection task,
  wherein the current scenario information is one or more of the following information:
    information related to user information being changed, information related to a network status being changed, information related to a quality of a user requested service being changed, information related to a quality of a user authorized service being changed, information related to the user's charging mode being changed, information related to the user's package quota and used amount being changed, and information related to the quota and used amount of a group to which the user belongs being changed,
  wherein the redirection result report information comprises:
    a Notify-Rule-Name that uniquely identifies that the result report information is used to report a performance result of the redirection task; and
    a Notify-Rule-Status that represents the performance result of the redirection task.

7. The method according to claim 6, wherein the service status change information comprises at least one of the following information: information related to a user going online, information related to the user's session being updated, and information related to the user ending the session; and
  wherein sending the service status change information to the PCRF comprises one or more of:
    sending a creation initial policy request and user information to the PCRF when the user goes online;
    sending an update policy request and service change information to the PCRF when the user's session is updated; and
    sending a Credit-Control-Request Terminate (CCRT) message to the PCRF when the user ends the session, and sending the creation initial policy request and the user information to the PCRF when initiating a session again for the user.

8. The method according to claim 7, wherein when the service status change information is that the user's session is updated, the redirection indication message further includes policy remove information that indicates to remove the user's current redirection policy;
  before performing the redirection operation according to the redirection indication message, the method further comprises:
    removing the user's current redirection policy according to the policy remove information.

9. The method according to claim 6, wherein performing the redirection operation according to the redirection indication information in the redirection indication message comprises:
  parsing the redirection indication message and acquiring the redirection indication information;
  redirecting a webpage currently accessed by a user to a designated information prompt page according to the redirection indication information.

10. A redirection apparatus, comprising:
  an information acquiring unit configured to acquire a service status change information and current scenario information;
  a policy deciding unit configured to determine whether to issue a redirection task to a Policy and Charging Enforcement Function (PCEF) according to the current scenario information;
  an information generating unit configured to generate a redirection indication message comprising redirection indication information according to the service status change information and the current scenario information when a redirection task is to be issued to the PCEF;

an information sending unit configured to send the redirection indication message to the PCEF, so that the PCEF performs a redirection operation according to the redirection indication information in the redirection indication message; and a receiving unit configured to receive from the PCEF a redirection result report message comprising redirection result report information, wherein the policy deciding unit is further configured to:

determine that a redirection task is to be issued to the PCEF when the current scenario information is any one of the following information:

information related to user information being changed, information related to a network status being changed, information related to a quality of a user requested service being changed, information related to a quality of a user authorized service being changed, information related to the user's charging mode being changed, information related to the user's package quota and used amount being changed, and information related to the quota and used amount of a group to which the user belongs being changed, and wherein the redirection result report information comprises:

a Notify-Rule-Name that uniquely identifies that the result report information is used to report a performance result of the redirection task; and a Notify-Rule-Status that represents the performance result of the redirection task.

11. The apparatus according to claim 10, wherein the service status change information comprises at least one of the following information: information related to a user going online, information related to the user's session being updated, information related to the user's subscription or status being changed, and information related to the user ending the session; and wherein when the information acquiring unit acquires service status change information, the information acquiring unit is further configured to perform at least one of:

receive a creation initial policy request and user information sent by the PCEF when the user goes online;

receive an update policy request and service change information sent by the PCEF when the user's session is updated;

receive service change information sent by a Subscription Profile Repository (SPR) when the user's subscription or status is changed; and receive a Credit-Control-Request Terminate (CCRT) message sent by the PCEF when the user ends the session, and receive the creation initial policy request and the user information sent by the PCEF when the PCEF initiates a session again for the user.

12. The apparatus according to claim 10, wherein the information generating unit comprises:

a determining module configured to determine a value of each parameter in the redirection indication information according to the service status change information and the current scenario information; and a generating module configured to carry the redirection indication information having each parameter with corresponding value through the indication message that is taken as the redirection indication message.

13. The apparatus according to claim 11, wherein when the service status change information is that the user's session is updated, or the user's subscription or status is changed, the redirection indication message further comprises policy remove information that indicates the PCEF to remove the user's current redirection policy.

* * * * *